US006975627B1

(12) United States Patent
Parry et al.

(10) Patent No.: US 6,975,627 B1
(45) Date of Patent: Dec. 13, 2005

(54) MODIFICATION OF TAG FIELDS IN ETHERNET DATA PACKETS

(75) Inventors: Robin Parry, Watford (GB); Justin A Drummond-Murray, Chorleywood (GB); David J Law, Kempston (GB); Daniel M O'Keeffe, Ballyhooly (IE)

(73) Assignee: 3Com Technologies, Georgetown (KY)

( * ) Notice: Subject to any disclaimer, the term of this patent is extended or adjusted under 35 U.S.C. 154(b) by 0 days.

(21) Appl. No.: 09/417,102

(22) Filed: Oct. 13, 1999

(30) Foreign Application Priority Data

Nov. 11, 1998 (GB) .................................... 9824594

(51) Int. Cl.[7] .............................................. H04L 12/56

(52) U.S. Cl. ................................. 370/389; 370/395.53

(58) Field of Search ................................ 370/392, 389, 370/474, 401, 395.53

(56) References Cited

U.S. PATENT DOCUMENTS

| | | | | |
|---|---|---|---|---|
| 4,780,889 | A | 10/1988 | Ley et al. | |
| 5,550,860 | A | 8/1996 | Georgiou et al. | |
| 5,642,386 | A | 6/1997 | Rocco, Jr. | |
| 5,751,723 | A * | 5/1998 | Vanden Heuvel et al. | 370/528 |
| 5,757,297 | A | 5/1998 | Ferraiolo et al. | |
| 5,920,566 | A * | 7/1999 | Hendel et al. | 370/401 |
| 5,950,115 | A | 9/1999 | Momtaz et al. | |
| 5,959,990 | A * | 9/1999 | Frantz et al. | 370/392 |
| 5,970,103 | A | 10/1999 | Townshend | |
| 6,014,380 | A * | 1/2000 | Hendel et al. | 370/392 |
| 6,115,394 | A * | 9/2000 | Balachandran et al. | 370/477 |
| 6,128,666 | A * | 10/2000 | Muller et al. | 709/238 |
| 6,151,322 | A * | 11/2000 | Viswanath et al. | 370/395.53 |
| 6,151,324 | A * | 11/2000 | Belser et al. | 370/397 |
| 6,181,699 | B1 * | 1/2001 | Crinion et al. | 370/392 |
| 6,449,279 | B1 * | 9/2002 | Belser et al. | 370/397 |
| 6,460,088 | B1 * | 10/2002 | Merchant | 709/236 |
| 6,597,695 | B1 * | 7/2003 | Desai et al. | 370/395.1 |

FOREIGN PATENT DOCUMENTS

| | | |
|---|---|---|
| EP | 0 153 107 | 8/1985 |
| EP | 0 365 337 | 4/1990 |
| EP | 0 424 741 | 5/1991 |
| EP | 0 465 201 | 1/1992 |
| EP | 0 508 886 | 10/1992 |
| EP | 0 841 782 | 5/1998 |
| GB | 2 283 645 | 5/1995 |
| GB | 2 336 075 | 10/1999 |
| GB | 2 337 674 | 11/1999 |
| GB | 2 343 816 | 5/2000 |
| GB | 2 344 030 | 5/2000 |
| WO | WO 96/34474 | 10/1996 |

OTHER PUBLICATIONS

Co-pending U.S. Appl. No. 09/286,470, Apr. 6, 1999.
Co-pending U.S. Appl. No. 09/253,538, filed Feb. 22, 1999.
Co-pending U.S. Appl. No. 09/645,569, filed Aug. 25, 2000.
WPI Abstract Accession No. 97-269820/1997 & JP090098171 (Hitachi) Apr. 8, 1997.
WPI Abstract Accession No. 93-390998/1993 & JP05292091 (Mitsubishi Electric) Nov. 5, 1993.

* cited by examiner

*Primary Examiner*—Ricky Ngo
*Assistant Examiner*—Derrick W Ferris
(74) *Attorney, Agent, or Firm*—Nixon & Vanderhye, P.C.

(57) ABSTRACT

An Ethernet data packet including a VLAN tag header and a VLAN identification field is modified. The modification is accomplished by inserting in place of the VLAN tag header a field of the same size including selected information. The VLAN identification may be retained. The inserted field may include a first field indicating the presence of the VLAN identification field and a second field of selected information, the second field being longer than the first field.

29 Claims, 3 Drawing Sheets

MODIFICATION OF TAG FIELDS IN ETHERNET DATA PACKETS

BACKGROUND TO THE INVENTION

The present invention relates to packet-switched data communication systems, and particularly to such systems operating according to the IEEE 802.1 transmission standard.

Data communication systems of this general character provide for communication between various parts of a network by means of physical devices that in general comprise a multiplicity of ports and direct received packets from one or more to one or more ports either indiscriminately, in the case of a hub, or selectively, in the case of a switch. The term "switch" is used herein to embrace more specifically named devices, such as bridges, routers or devices that combine both bridging and routing functions.

In a variety of circumstances it is desirable to be able to couple a plurality of devices, such as a multiplicity of hubs or switches, together so that from the point of view of the external network, the plurality of coupled or "stacked" devices acts as a single logical entity. Such a facility is useful to enable a network to be increased in traffic carrying capacity.

To facilitate the operation of the units of a stack as a single logical entity, it is desirable for a packet progressing through the stack to carry selected information which enables a device within a stack to recognise the data packet as coming from another unit in the stack, or, analogously, from another chip in a device which is composed of a multiplicity of chips connected by links or buses to form a single switch or other network device.

Although it is known generally for devices to identify their nature and status to other devices by means of for example, a "handshake routine", such routines or other processes which necessarily involve the generation of additional data packets on a link are in general undesirable, particularly at very high data rates. It is accordingly preferable to be able to convey selected or inter-device data within an existing data packet. Theoretically it is possible to append data onto the beginning or end of an existing packet's data field. Such an expedient is not desirable because data packets in general and Ethernet data packets in particular have a prescribed maximum length, so that if extra data is added to a packet which is close to or equal to the maximum length, the packet will become "illegal". In existing multi-chip devices such a packet would appear to be in error and may be discarded or truncated by the destination device. In both cases, data will be lost.

Using the preamble to a data packet to convey additional information may be feasible in some circumstances but in general it would require redesign of existing devices.

SUMMARY OF THE INVENTION

The present invention avoids the difficulties of techniques that include adding data before or after existing data fields.

The present invention relies on the existence, in current Ethernet standards, of a requirement for a header that preceeds a tag that is used to denote a number identifying a virtual local area network. As is well known, a network may be artificially partitoned into "virtual" local area networks (VLANs) (which may overlap) so as for example to limit the propagation of "broadcast" packets to a respective VLAN. The present invention is based on the use of the VLAN tag header to convey the selected or proprietary information.

It is possible, by means of a process known as auto-negotiation, to confirm that devices connected by a data link are compatible. If the devices are represented by different chips in a multi-chip device, such auto-negotiation would normally be unnecessary. The purpose of establishing compatibility in the present context would be to ensure that the data link between the devices which are to form a common logical entity must be such that every packet intended for transmission by way of the link has a VLAN tag header. If this be so, then the information in that header is redundant and it is also known that certain bytes have a particular content. The present invention therefore envisages the use of the relevant bit positions in the packet to transmit selected information at least while the packet is traversing the link, without any loss of essential packet information or exceeding of the maximum length of the packet.

DESCRIPTION OF a PREFERRED EXAMPLE

Figure 1:
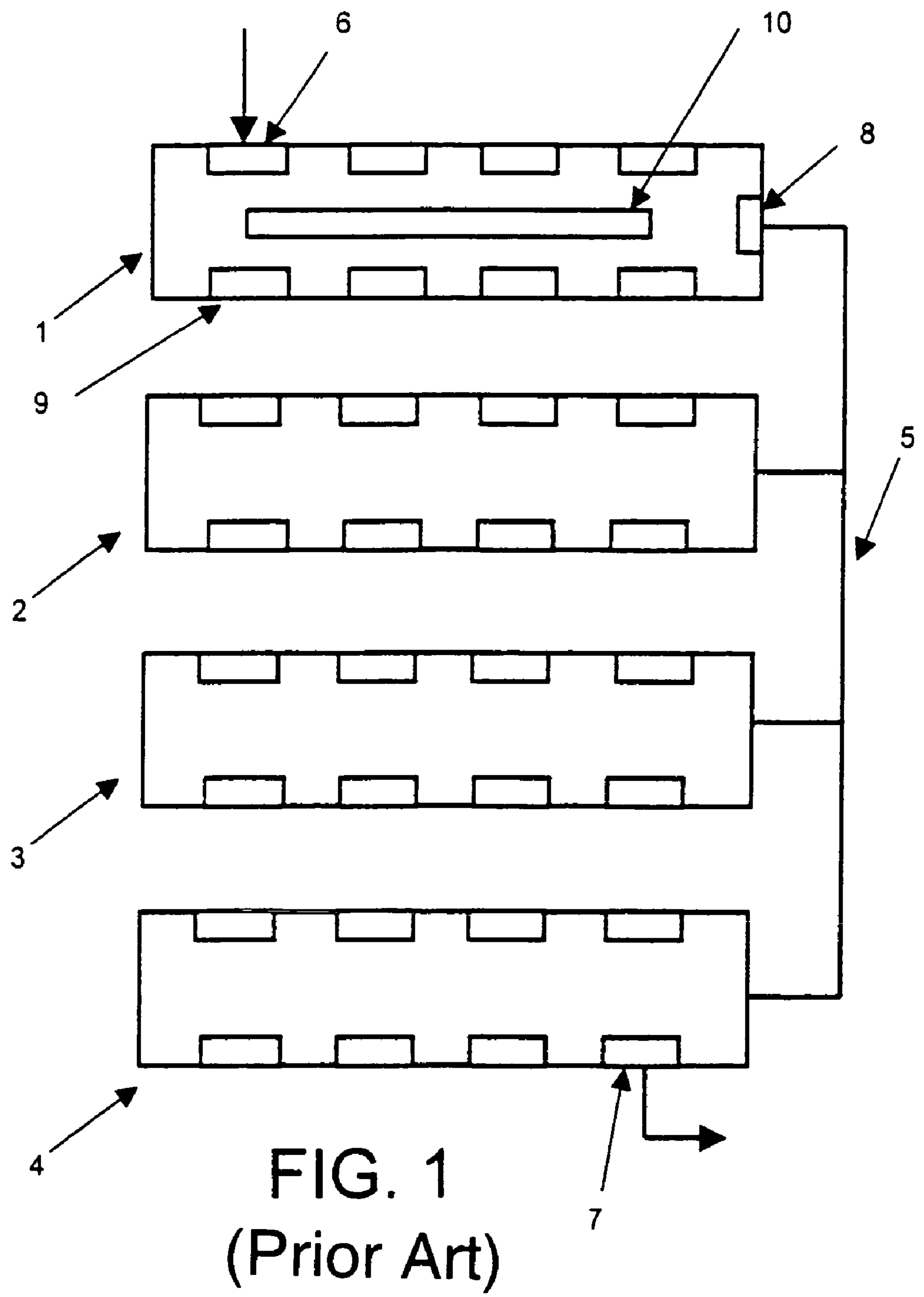
FIG. 1 illustrates a stack of network devices.

FIG. 1 of the drawings illustrates schematically only a typical context where the present invention may be employed. The context is a 'stack' of similar network devices 1, 2, 3 and 4 which are connected, preferably by means of a cascade connection 5, to form in essence a single logical unit. One description of a cascade connection between network units is described in U.S. patent Ser. No. 09/207,655 filed 9 Dec. 1998 (and now U.S. Pat. No. 6,330,245) and incorporated herein by reference. In the example given, devices 1 to 4 may be multi-port devices each having a multiplicity of ports at which data packets may be received and from which data packets may be forwarded. A single device in isolation would, if performing a switching function, typically perform in processing means 10 some examination of address data in the header portion of a receive packet and by means of a forwarding database determine the port from which the packet should be dispatched. The cascade connection 5 enables, along with appropriate configuration of the devices 1 to 4, the devices to form a combined unit so that, in general, a packet received on any of the ports on any of the devices may be dispatched from any of or all the ports on any of the devices. Merely by way of example, FIG. 1 shows diagrammatically a packet entering a port 6 on device 1 and leaving a port 7 on device 4.

In circumstances such as these, wherein the units of a stack are operated as a single logical entity, it is desirable for a packet progressing through the stack to carry selected information which enables a device within a stack to recognise the data packet as coming from another unit in a stack. Analogously, a device may be formed of a multiplicity of chips connected by links or buses to form a single switch or other network device. In that context also it may be desirable for a packet received by one chip to carry information which enables another chip in the combined device to recognise the data packet as coming from a chip in the assembly.

It is generally known in the operation of network systems to perform the process of auto-negotiation, as particularly described for example in IEEE Standard 802.3, 1998 Edition (published by the Institute of Electrical and Electronic Engineers, Inc, New York). The process of auto-negotiation is used for a variety of purposes, such as for example establishing the data rate between a port on one device and a port on another but the process generally involves the setting a multiplicity of configuration registers which can be used to identify a port in a characteristic way. All that is required for this purpose is the setting of a relevant bit in a control or configuration register so that the customary examination of the header of a packet as it enters a system or stack can include recourse to that particular bit in the register. In what follows, the setting of such a bit is deemed to constitute the answer 'yes' or 'no' to the notional question 'is the port proprietary?'. The answer to a question merely indicates whether a particular egress port will forward the packet to another device within the stack or system within which the VLAN tag header is redundant (e.g. by way of port 8 of device 1) or will forward the packet outside such a stack or system (e.g. by way of port 9 of device 1).

The main purpose of the invention is to modify a packet, on the assumption that the egress port is proprietary, with selected information.

Figure 2:
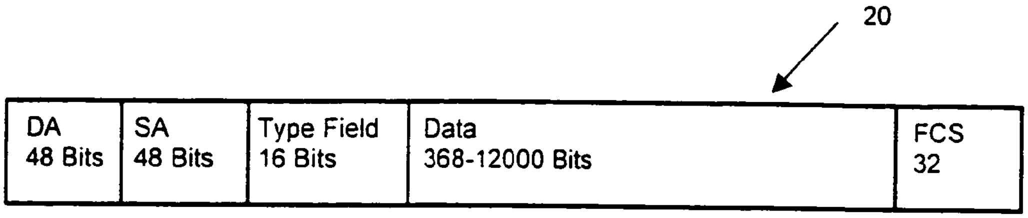
FIG. 2 illustrates an untagged Ethernet data packet.

FIG. 2 of the drawings illustrates the basic format 20 for all Ethernet packets, whether they are tagged or not. Ignoring certain starter frame and end of frame fields, the packet typically comprises, as it enters a device 1, a destination address, conventionally composed of a 48 bit word, a source address, likewise conventionally composed of a 48 bit word, a type field (16 bits), data, which in general may comprise from 368 to 12000 bits, and a frame check sum (32 bits). It is customary to tag a packet to include an identification of the virtual local area network relevant to the packet. As is well known from many publications, it is customary to partition artificially a physical local area network into a multiplicity of virtual local area networks so that, for example, if it is necessary to broadcast a packet, it is broadcast only to the devices which are defined to be within a respective virtual local area network. The division of a local area network into a multiplicity of virtual local area networks need not be exclusive; thus different virtual local area networks may overlap.

Figure 3:
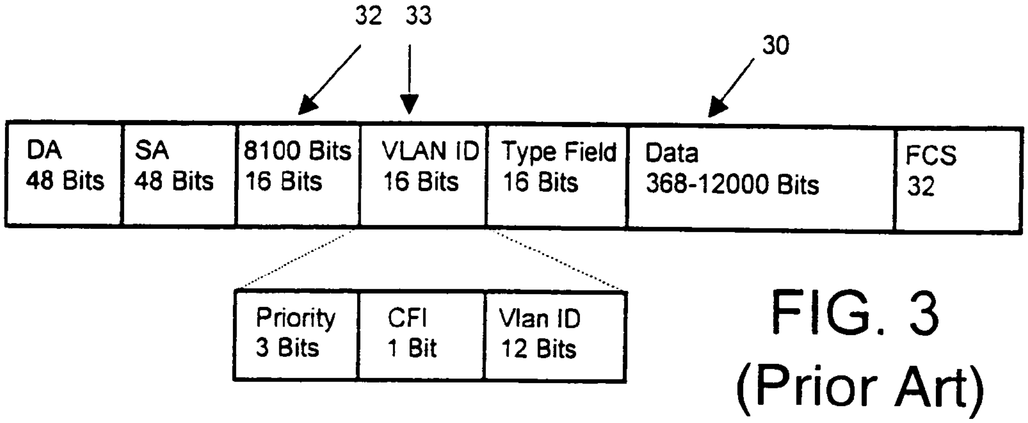
FIG. 3 illustrates a normal tagged Ethernet data packet.

If a packet 30 is tagged as shown in FIG. 3 with VLAN identification, it customarily has a 'VLAN tag header' field 32, known as the "8100" field, which indicates that the VLAN tag is present. In particular, this enables interpretation of the next group 33 of 16 bits after the VLAN tag header as containing the VLAN information. The VLAN identification field 33 normally comprises, as shown in FIG. 3, a 3 bit priority field, a 1 bit CFI field and a 12 bit identification field. The next following 16 bits hold the original type field information. The only means for flagging that a VLAN tag is present is the "8100" type field 32. If any other value in a normal system is present in the type field the VLAN data would be taken as the first part of the packet data.

If, for example, a packet which already contained 1518 bytes had a VLAN tag added to it, so that its size increased to 1522 bytes, that represents the maximum size for any Ethernet packet. There is no way to add any additional information to such a packet without causing the packet to become oversized and therefore automatically discarded by an Ethernet MAC.

The present invention not only provides for special tagging but also the compression of data so that the danger of causing a packet to become oversized is avoided.

It may be appreciated that if a packet enters a system, e.g. at port 6 in FIG. 1, there is no need for the VLAN tag header while the packet remains within the system. Thus, the VLAN tag header may be replaced with some selected information, by the time it leaves port 8 coupled to the cascade 5 which forms the link between the units in the stack.

Figure 4:
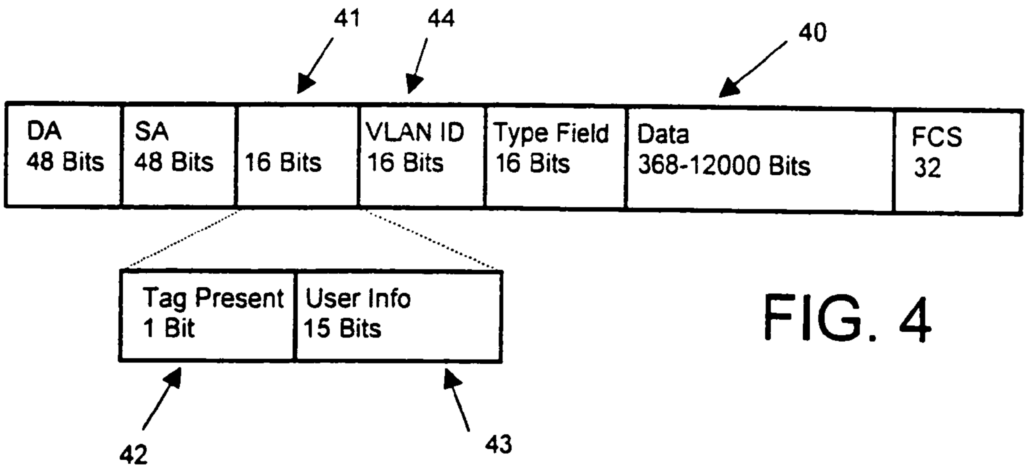
FIG. 4 illustrates a packet tagged according to the invention.

FIG. 4 illustrates a tagged packet 40 according to the invention. The VLAN tag header field 32 has been removed and a field 41 of the same length (16 bits) has been inserted. This conveniently comprises a 1 bit field 42 indicating whether the tag is present or not and a 15 bit tag field 43 which defines selected information. The 1 bit field represents a compression of the VLAN tag header fields. The selected information may include a field which identifies the packet, to other members of the stack, i.e. units 2, 3 and 4, that the packet has come from a unit within the stack, in this case unit 1. As may be seen from FIG. 4, none of the necessary information is lost. In the new scheme, the bits after the source address are redundant because the presence of the VLAN tag identifier 33 (shown at 44 in FIG. 4) can be inferred.

When the receiving end of the link receives the packet it will examine the bit 42 and see that it could use the tag 43 to determine priorities or for some other purpose. When the packet is transmitted out of a port not connected to another unit in the system the tag header 42 and tag 43 can readily be removed in favour of the standard VLAN tag identifier "8100" and then the packet will be in the same format as it was when it initially entered the system.

The scheme thus allows control information to be passed between the units of the stack, or in general, different units within a physical system, with no increase in bandwidth for tagged packets.

Figure 5:
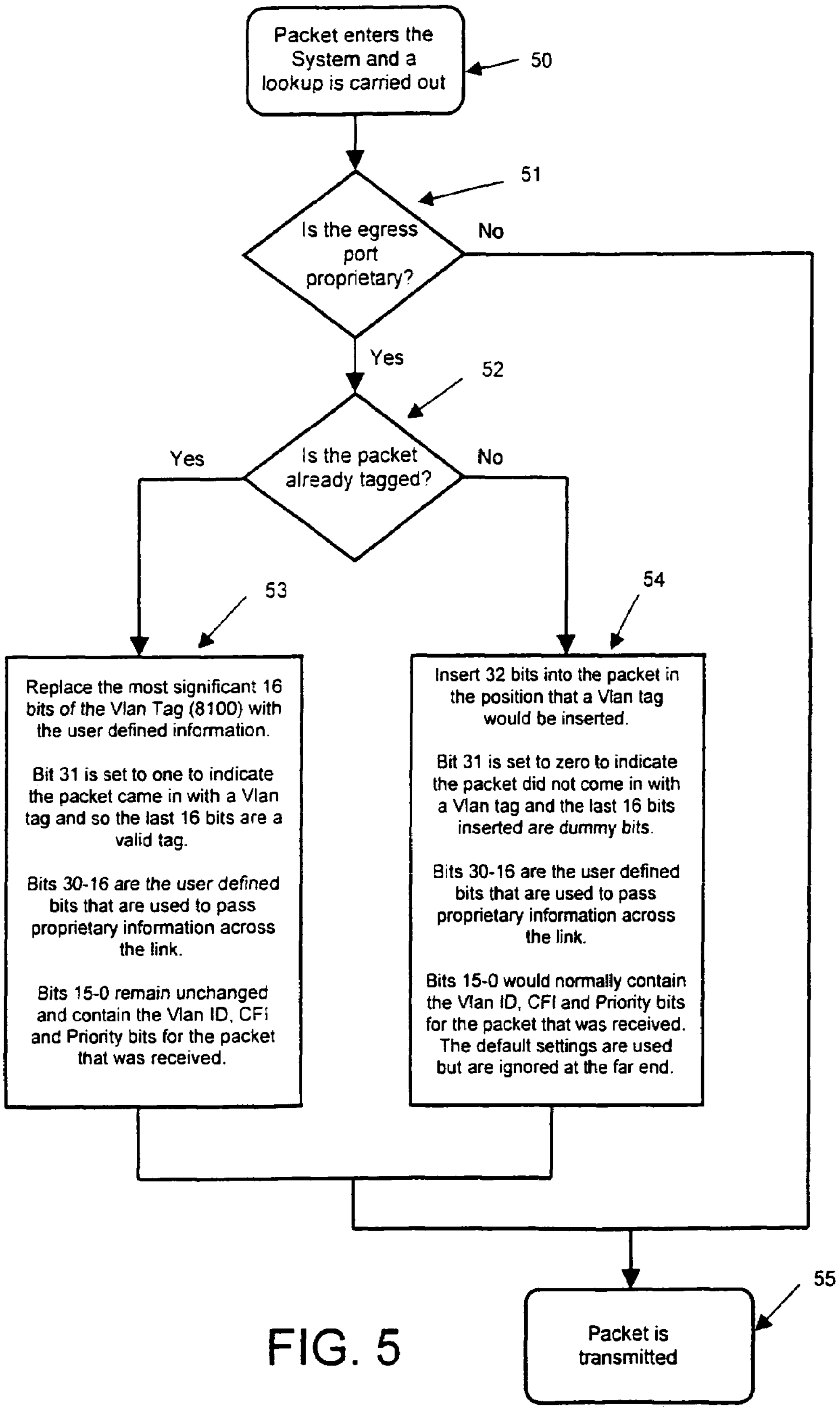
FIG. 5 illustrates a process according to the invention.

FIG. 5 is a summary of the process applied to a packet entering unit 1 and intended for transmission within the system. Stage 50 indicates the entry of the packet into the system, for example by any of the ports. Stage 51 will be performed after a look up determines whether the packet is intended for dispatch from any of the ports of unit 1, and so will leave the system, or is intended for dispatch by port 8 within the system. In the former case, modification of tagging cannot apply and accordingly the packet is transmitted, as shown by stage 55. If the packet is to leave switch 1 by port 8, then further examination (stage 52) needs to be made to indicate whether the packet is already tagged. If the packet is not already tagged, 32 bits must be inserted (stage 54) into the packet in the position where a VLAN tag would be inserted. The first bit, i.e. bit 31, will be set to 0 to indicate the packet did not come in with a VLAN tag and so the last 16 bits inserted will be dummy bits in the position which would be occupied by a VLAN tag 33. Bits 30 to 16 are the user define bits that are used to pass proprietary information across the link. Bits 15 to 0 would normally contain the VLAN identification, CFI and priority bits for the packets that were received.

If the packet is already tagged, then the most significant 16 bits of the VLAN tag will be replaced (stage 53). Bit 31 (shown at 42) will be set to unity to indicate that the packet came in with a VLAN tag and so that the last 16 bits (44) represent a valid tag. Bits 30 to 16 of the user defined bits are used to pass proprietary information across the link. Bits 15 to 0 remain unchanged and as before contain the VLAN identification, CFI and priority bits for the packet that was received.

The remodification of the packet as it leaves the system requires only the replacement of the user defined bits 30 to 16 as well as bit 31 with the standard VLAN header tag "8100".

What is claimed is:

1. A method of modifying an Ethernet data packet which includes a standard VLAN tag header and a VLAN identification field, comprising inserting in place of said standard VLAN tag header a field of the same size including selected information wherein the inserted field comprises a first field indicating the presence of the VLAN identification field and a second field of selected information, said second field being longer than said first field.

2. A method according to claim 1 wherein the inserted field ceases to form a standard VLAN tag header.

3. A method according to claim 1 wherein the inserted field does not comply with a transmission standard with which the standard VLAN tag header complies.

4. A method according to claim 1 wherein the second field of selected information indicates that the data packet has originated from a device in a stack of devices to the other devices of the stack, the devices of the stack being connected by a cascade connection.

5. A method of modifying an Ethernet data packet which includes a VLAN tag header and a VLAN identification field, comprising inserting in place of said VLAN tag header a field of the same size including selected information, wherein the inserted field comprises a first, one-bit field indicating the presence of the VLAN identification field and a second field of selected information, said second field being longer than said first field.

6. A method of modifying an Ethernet data packet, comprising:

(i) determining whether the packet includes a VLAN tag header and a VLAN identification field;

(ii) inserting, when the packet does not include a VLAN tag header and a VLAN identification field, a first field, including a first indication of the absence of the said VLAN tag header and said VLAN identification field, and a second field constituting a dummy field; and (iii) inserting in place of the VLAN tag header if said header and said VLAN identification field are present, a field including a second indication, denoting the presence of said VLAN identification field, and selected information.

7. A method according to claim 6 wherein said first and second indications are different values of a one-bit field.

8. A method according to claim 6 and including, before said packet is modified, determining whether said packet is to be transmitted over a link wherein the VLAN tag header is redundant.

9. A method according to claim 8, wherein said link extends between at least two network devices which form a single logical entity.

10. A method according to claim 9 wherein said devices are stacked.

11. A method of transmitting an Ethernet packet through a stack of network devices, said packet including a VLAN tag comprising a standard tag header and a VLAN identification field, the method comprising:

(a) receiving the packet at a first device in said stack of devices;

(b) performing determination whether said packet is to be dispatched externally of said stack from said first device or is to be dispatched from a second device in said stack;

(c) in the event that said determination is that said packet is to be dispatched externally of said stack from said first device, forwarding said packet without modification of said standard tag header; and (d) in the event that said determination is that said packet is to be dispatched from said second device:

(i) modifying said standard tag header to include selected information such that the tag header ceases to be a standard tag header, while retaining said VLAN identification field;

(ii) transmitting said packet through said stack to said second device in said stack; and (iii) before said packet leaves said second device, replacing said selected information with said standard tag header.

12. A method as in claim 11 wherein said selected information comprises a first field indicating the presence of said VLAN identification field and a second field which is longer than said first field.

13. A method according to claim 12 wherein the second field indicates that a packet has originated from one of the network devices in the stack of network devices to the other network devices of the stack, the devices of the stack being connected by a cascade connection.

14. A method of modifying an Ethernet data packet which includes a standard VLAN tag header and a VLAN identification field, comprising inserting in place of the VLAN tag header a field of the same size including a first field indicating the presence of said VLAN identification field and a second field of proprietary information so that said VLAN tag header ceases to be a standard VLAN tag header field, while retaining said VLAN identification field.

15. A network device having ports for receiving and forwarding data packets conforming to an Ethernet standard, said network device being organized:

(a) to receive at one of said ports an Ethernet packet having a standard VLAN tag header and a VLAN identification field;

(b) to insert in place of said standard VLAN tag header a field of the same size including a first field indicating the presence of said VLAN identification field and a second field of proprietary information so that said standard VLAN tag header ceases to be a standard VLAN tag header; and (c) to retain in said Ethernet packet said VLAN identification field.

16. A network device as in claim 15 wherein said network device responds to a received data packet having selected information in place of a standard VLAN tag header to restore said standard VLAN tag header before forwarding said received data packet from a port.

17. A stack of network devices for the reception and forwarding of an Ethernet packet including a VLAN tag comprising a standard tag header and a VLAN identification field, wherein (a) a first device in said stack of devices receives said Ethernet packet;

(b) said first device makes a determination whether said packet shall be forwarded to an external network directly from said first device or shall be forwarded to a second device in said stack;

(c) in the event that said determination is that said packet shall be forwarded to an external network directly from said first device, said first device forwards said packet to said external network without modification of said VLAN tag header;

(d) in the event that said determination is that said packet shall be forwarded to said second device, said first device modifies said standard tag header to include selected information while retaining said VLAN identification field;

(e) said second device in said stack receives said Ethernet data packet from said first device; and (f) said second device replaces said selected information with said standard tag header before said Ethernet data packet leaves said second device.

18. A stack as in claim 17 wherein said first device inserts said selected information as a first field indicating the presence of said VLAN identification field and a second field which is longer than said first field and comprises proprietary information.

19. A stack according to claim 18 wherein the second field indicates to said second device that the packet has come from the first device, the devices of the stack being connected by a cascade connection.

20. A stack according to claim 17 wherein the first device modifies the standard tag header such that the modified tag header does not comply with a transmission standard with which the standard tag header complies.

21. A network device for the forwarding and reception of Ethernet data packets, said network device including packet processing means organized:

(i) to determine whether a received packet includes a VLAN tag header and a VLAN identification field;

(ii) to insert in said received packet, when said received packet does not include a VLAN tag header and a VLAN identification field, a first field, including a first indication of the absence of said VLAN tag header and said VLAN identification field, and a second field constituting a dummy field; and (iii) to insert in place of said VLAN tag header if said VLAN header and said VLAN identification field are present in said received packet, a field including a second indication, denoting the presence of said VLAN identification field, and selected information.

22. A network device as in claim 21 wherein said first and second indications are different values of a one-bit field.

23. A network device as in claim 21 wherein said network device is further organized to determine, before said received packet is modified, whether said received packet is to be transmitted over a link wherein the VLAN tag header is redundant.

24. A method of transmitting an Ethernet data packet within a stack of units acting as a single logical entity, comprising:

receiving at one of said units said Ethernet data packet, which includes a standard VLAN tag header and a VLAN identification field;

inserting in place of the standard VLAN tag header a field of the same size including selected stack information such that the VLAN tag header ceases to be a standard VLAN tag header, while retaining said VLAN identification field; and elsewhere in said stack, decoding the selected information.

25. A method as in claim 24, wherein said Ethernet packet includes a cyclic redundancy check field and the method further comprises:

recomputing said cyclic redundancy check field on said Ethernet data packet including a proprietary field.

26. A stack of units acting as a single logical entity, wherein:

a first unit is organized to receive an Ethernet data packet which includes a standard VLAN tag header and a VLAN identification field;

said first unit inserts in place of said standard VLAN tag header a field of the same size including selected stack information such that the VLAN tag header ceases to be a standard VLAN tag header, while retaining said VLAN identification field; and a second unit is organized to receive said Ethernet data packet from said first unit and to decode the selected stack information.

27. A stack as in claim 26, wherein:

said Ethernet data packet includes a cyclic redundancy check field; and said first unit recomputes said cyclic redundancy check field on said Ethernet data packet including a proprietary field.

28. A stack as in claim 26, wherein:

said second unit re-inserts said standard VLAN tag header in place of said field including said selected stack information.

29. A method of modifying an Ethernet data packet which includes a standard VLAN tag header and a VLAN identification field, comprising inserting in place of said standard VLAN tag header a field of the same size including selected information, wherein the inserted field comprises a first, one-bit field indicating the presence of the VLAN identification field and a second field of selected information, said second field being longer than said first field.

* * * * *